United States Patent Office 2,954,379

Patented Sept. 27, 1960

2,954,379

RUBBER CHEMICAL

Edwin O. Hook, Bay Village, Ohio, and Gerard A. Loughran, Stamford, Conn., assignors to American Cyanamid Company, New York, N.Y., a corporation of Maine No Drawing. Filed June 7, 1957, Ser. No. 664,178

5 Claims. (Cl. 260—247.1)

This invention relates to new compounds. Further, it relates to a process of vulcanizing natural and synthetic rubber and rubber latices using these compounds as accelerators, and to compositions of matter comprising said compounds as accelerators.

The new compounds of this invention are alkoxybenzenedithiophosphonamidates of the formula

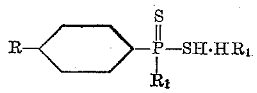

in which R is a lower alkoxy radical, $R_1$ is an amino or guanidino group and $HR_1$ is a salt forming organic base. These compounds may be prepared by first reacting an alkoxybenzene and $P_2S_5$, and treating the reaction product with the desired amine or a guanidine.

The amino compound which may be employed in the preparation of the compounds of this invention may be any primary or secondary cycloaliphatic, aromatic or heterocyclic amine. For example, there may be employed arylamines such as aniline, toluidine, xylidine, naphthylamines, ortho and para phenylenediamine, diphenylamine, benzylamine and the like; arylalkylamines such as N-methylaniline and N-ethylaniline; heterocyclic amines such as morpholine, piperidine, furfurylamine, and the like; and cycloalkylamines such as cyclohexylamine, methylcyclohexylamine and the like. The guanidino compound may be an alkylguanidine such as the mono- or di-methyl, ethyl, propyl, butyl, amyl or higher alkylguanidines; or an arylguanidine such as the mono- and di-phenyl and tolyl guanidines. The alkoxybenzene may be a lower alkoxy benzene such as anisole, phenetole and the like.

The compounds of the present invention are particularly useful as accelerators in the vulcanization of natural rubber as well as synthetic rubber. By the latter is meant rubber-like polymers of butadiene-1,3 as well as substituted butadienes such as methyl-2-butadiene-1,3, chloro-2-butadiene-1,3, and the like. In addition, it is intended to include copolymers of butadiene-1,3 with a polymerizable compound containing an olefinic linkage such as acrylonitrile, styrene, acrylamide, isobutylene and the like.

The amount of accelerator employed may vary according to the particular composition being treated. When used in natural rubber or latex, the accelerator may be present in amounts as high as 5% on the rubber. Usually, however, it will not be more than about 3 or 4%. When treating synthetic rubber-like polymers and copolymers or synthetic latices, the amount of accelerator will generally be somewhat less. In either case, the amount of accelerator will usually not exceed 1.5%, being for the most part employed in amounts of about 0.2–1.0%.

The following examples further illustrate the invention. All parts are by weight unless otherwise indicated.

EXAMPLE 1

216 parts of anisole and 110 parts of $P_2S_5$ are heated with stirring at 140°–160° C. for five hours. The reaction mass is then cooled and the yellow crystalline solid filtered off and washed with benzene. The benzene washings are added to the filtrate and additional precipitate separated and washed. Total yield of light yellow crystalline solid, M.P. 214–217° C., is 204 parts.

EXAMPLE 2

*Anilinium-N-phenyl-p-methoxy-benzenedithiophosphonamidate*

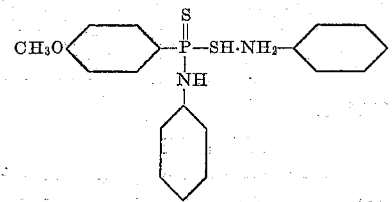

40 parts of the reaction product of Example 1 is added with stirring to a solution of 37 parts of aniline in 1000 parts of toluene. After completion of the reaction, the precipitated solids are separated, washed and dried to give 63 parts of product, M.P. 172–173° C.

EXAMPLE 3

*Cyclohexylammonium-N-cyclohexyl-p-methoxy-benzenedithiophosphonamidate*

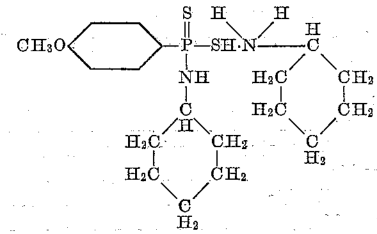

20 parts of the reaction product of Example 1 is added slowly to a solution of 20 parts of cyclohexylamine in 500 parts of water. After stirring for an additional two hours, the solid product is filtered, washed and dried. A yield of 28 parts of product, M.P. 195–198° C., is obtained.

EXAMPLE 4

*Morpholinium-N-oxydiethylene-p-methoxy-benzenedithiophosphonamidate*

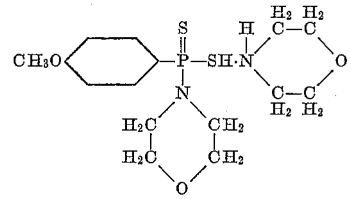

20 parts of the reaction product of Example 1 is added to a solution of 17 parts of morpholine in 100 parts of benzene. After addition is complete, the mixture is stirred for an additional three hours. During this time, substantially all the solvent evaporates. 30 parts of the residue is dissolved in 500 parts of isopropanol and heated to boiling to give a clear yellow solution. The solution is heated for an additional half-hour and then filtered. The filtrate is a clear light yellow liquid from which a crystalline product precipitates on cooling. The crystalline product is filtered, washed and dried to give a yield of 17 parts, M.P 164–166° C.

EXAMPLE 5

*Piperidinium-N-cyclopentamethylene-p-methoxy-benzene-dithiophosphonamidate*

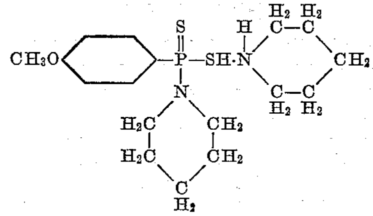

20 parts of the reaction product of Example 1 is added to a solution of 17 parts of piperidine and 100 parts of benzene. The mixture is stirred for an additional two hours during which time the solvent partially evaporates and a semi-crystalline mushy solid separates. 350 parts of acetone are added and the mixture stirred for an additional two hours. The finely divided solid is then filtered, washed and dried to give a yield of 14 parts, M.P. 151–153° C.

EXAMPLE 6

The procedure of Examples 2–4 are repeated replacing the reaction product of anisole and $P_2S_5$ with equivalent amounts of the reaction product of phenetole and $P_2S_5$. Products corresponding to those of Examples 2–4 are obtained.

Other compounds within the scope of this invention may be prepared by varying the amine or guanidine as previously described.

The following example illustrates the vulcanization of rubber using as accelerators compounds according to this invention.

EXAMPLE 7

Compositions are prepared according to the following base formula:

| Compound: | Parts |
|---|---|
| Pale crepe | 100 |
| Calcene TM (calcium carbonate) | 30 |
| Zinc oxide | 5 |
| Titanium dioxide | 25 |
| Stearic acid | 2 |
| Keystone whiting | 40 |
| Sulfur | 2.85 |
| Accelerator | 1.25 |

Samples of these compositions containing as accelerators the methoxybenzenedithiophosphonamidates shown in Table I are cured at 141° C. for 25 minutes. Results appear in Table I.

TABLE I

| No. | Accelerator | 25 Min./141° C. | | |
|---|---|---|---|---|
| | | Mod. at 300% | Tensile | Elong., Percent |
| 1 | MBTS | 400 | 2,600 | 670 |
| 2 | Cyclohexylammonium-N-cyclohexyl- | 450 | 2,900 | 670 |
| 3 | Piperidinium-N-cyclopentamethylene- | 500 | 2,875 | 670 |
| 4 | Morpholinium-N-oxydiethylene- | 550 | 2,150 | 590 |

Results similar to those of Table I are obtained when vulcanizing synthetic rubbers and when using accelerators according to this invention other than those exemplified.

We claim:

1. An alkoxybenzenedithiophosphonamidate having the formula

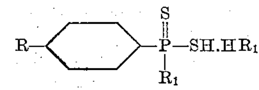

in which R is a lower alkoxy radical and $R_1$ is an amino radical selected from the group consisting of anilino, toluidino, xylidino, naphthylamino, ortho phenylenediamino, para phenylenediamino, diphenylamino, benzylamino, N-methyl anilino, N-ethyl anilino, morpholino, piperidino, furfurylamino, cyclohexylamino, methyl cyclohexylamino.

2. Cyclohexylammonium-N-cyclohexyl - p - methoxybenzenedithiophosphonamidate.

3. Piperidinium-N-cyclopentamethylene - p - methoxybenzenedithiophosphonamidate.

4. Morpholinium-N-oxydiethylene - p - methoxy-benzenedithiophosphonamidate.

5. Anilinium - N - phenyl - p - methoxy - benzenedithiophosphonamidate.

References Cited in the file of this patent

UNITED STATES PATENTS

| | | |
|---|---|---|
| 2,459,763 | Heywood | Jan. 18, 1949 |
| 2,655,533 | Lewis et al. | Oct. 13, 1953 |
| 2,682,521 | Coover | June 29, 1954 |
| 2,700,659 | Carr | Jan. 25, 1955 |
| 2,776,311 | Erbel et al. | Jan. 1, 1957 |